US006217794B1

(12) United States Patent
Neal et al.

(10) Patent No.: US 6,217,794 B1
(45) Date of Patent: Apr. 17, 2001

(54) FIBER COATING COMPOSITION HAVING AN INVISIBLE MARKER AND PROCESS FOR MAKING SAME

(75) Inventors: Richard Dixon Neal; Barbara Crawford Jackson; James John Krutak, Sr., all of Kingsport, TN (US)

(73) Assignee: Isotag Technology, Inc., Houston, TX (US)

( * ) Notice: Subject to any disclaimer, the term of this patent is extended or adjusted under 35 U.S.C. 154(b) by 0 days.

(21) Appl. No.: 09/302,382

(22) Filed: Apr. 30, 1999

Related U.S. Application Data

(60) Provisional application No. 60/087,429, filed on Jun. 1, 1998.

(51) Int. Cl.$^7$ ............................. B42D 15/00; D06P 1/92; C09K 11/02
(52) U.S. Cl. ............................ 252/301.35; 252/301.34; 8/648; 428/670; 427/157
(58) Field of Search ................... 106/31.15; 252/301.16, 252/301.34, 301.35; 8/648; 427/157; 428/670

(56) References Cited

U.S. PATENT DOCUMENTS

| | | | |
|---|---|---|---|
| Re. 27,117 | 4/1971 | Byrne et al. | 260/314.5 |
| Re. 34,480 | 12/1993 | Eda | 540/139 |
| 3,614,430 | 10/1971 | Berler | 250/71 |
| 3,630,941 | 12/1971 | Bergmark | 252/186 |
| 3,734,874 | 5/1973 | Kibler et al. | 260/27.2 |
| 3,779,993 | 12/1973 | Kibler et al. | 260/755 |
| 3,828,010 | 8/1974 | Davis et al. | 260/75 N |
| 3,933,094 | 1/1976 | Murphy et al. | 101/426 |
| 4,202,491 | 5/1980 | Suzuki | 235/471 |
| 4,233,196 | 11/1980 | Sublett | 260/29.2 N |
| 4,239,261 | 12/1980 | Richardson | 283/21 |
| 4,250,078 | 2/1981 | McFarlane et al. | 260/40 R |
| 4,321,133 | 3/1982 | DiGiacomo | 209/3.3 |
| 4,335,220 | 6/1982 | Coney | 523/714 |
| 4,408,004 | 10/1983 | Pengilly | 524/137 V |
| 4,420,581 | 12/1983 | McFarlane et al. | 524/431 |
| 4,423,814 | 1/1984 | White | 207/3.3 |
| 4,435,220 | 3/1984 | Watanabe et al. | 106/291 |
| 4,476,272 | 10/1984 | Pengilly | 524/398 |
| 4,504,084 | 3/1985 | Jauch | 283/74 |
| 4,535,178 | 8/1985 | Pengilly | 524/378 |
| 4,540,595 | 9/1985 | Acitelli et al. | 427/7 |
| 4,541,438 | 9/1985 | Parker et al. | 128/664 |
| 4,591,707 | 5/1986 | Stenzel et al. | 235/493 |
| 4,606,859 | 8/1986 | Duggan et al. | 540/122 |
| 4,649,064 | 3/1987 | Jones . | |
| 4,655,788 | 4/1987 | Jalon | 8/678 |
| 4,704,309 | 11/1987 | Coney et al. | 427/258 |
| 4,736,425 | 4/1988 | Jalon | 380/59 |
| 4,738,785 | 4/1988 | Langston et al. | 210/730 |
| 4,804,719 | 2/1989 | Weaver et al. | 525/420 |
| 4,824,948 | 4/1989 | Stark et al. | 540/125 |
| 4,883,714 | 11/1989 | Stockl et al. | 428/412 |
| 4,904,567 | 2/1990 | Maeda et al. | 430/270 |
| 4,910,292 | 3/1990 | Blount | 328/272 |
| 4,915,827 | 4/1990 | Rosenthal | 209/577 |
| 4,921,280 | * 5/1990 | Jalon | 8/648 |
| 4,973,656 | 11/1990 | Blount | 528/272 |
| 4,975,220 | 12/1990 | Streitel et al. | 252/301.35 |
| 4,983,817 | 1/1991 | Dolash et al. | 235/462 |
| 4,992,204 | 2/1991 | Kluger et al. | 252/301.16 |
| 5,006,598 | 4/1991 | Adams et al. | 524/601 |
| 5,030,708 | 7/1991 | Krutak et al. | 528/272 |
| 5,055,500 | 10/1991 | Peters et al. | 523/319 |
| 5,064,221 | 11/1991 | Miehe et al. | 288/67 |
| 5,083,814 | 1/1992 | Guinta et al. | 283/70 |
| 5,093,147 | * 3/1992 | Andrus et al. | 427/7 |
| 5,102,980 | 4/1992 | Krutak et al. | 528/272 |
| 5,110,968 | 5/1992 | Tai et al. | 556/715 |
| 5,120,610 | 6/1992 | Wegner et al. | 428/447 |
| 5,143,671 | 9/1992 | Peters et al. | 264/117 |
| 5,169,881 | 12/1992 | Peters et al. | 323/319 |
| 5,194,319 | 3/1993 | Onaka et al. | 428/224 |
| 5,201,921 | * 4/1993 | Luttermann et al. | 8/506 |

(List continued on next page.)

FOREIGN PATENT DOCUMENTS

| | | |
|---|---|---|
| 19512773 A1 | 10/1996 | (DE) . |
| 0 719 654 A1 | 7/1996 | (EP) . |
| 1537375 | 12/1978 | (GB) . |
| 2237804 | 5/1991 | (GB) . |
| 3-234860 | 10/1991 | (JP) . |

OTHER PUBLICATIONS

Wheeler, Bob L. et al., "A Silicon Phthalocyanine and Silicon Naphthalocyanine: Synthesis, Electrochemistry, and Electrogenerated Chemiluminescence", J. Am. Chem. Soc., vol. 106, pp. 7404–7410 (1984). no month.

Chemical Abstracts, vol. 77, p. 74, 141469m (1972). no month.

Chemical Abstracts vol. 106, p. 80. 86223s (1987). no month.

Chemical Abstracts, vol. 114, p. 98, 230681z (1991). no month.

Chemical Abstracts, vol. 114, p. 744, 196444n (1991). no month.

Chemical Abstracts, vol. 114, p. 744–745, 196445p (1991). no month.

Chemical Abstracts, vol. 114, p. 742, 196418g (1991). no month.

Primary Examiner—C. Melissa Koslow
(74) Attorney, Agent, or Firm—John R Casperson; Mark L. Davis

(57) ABSTRACT

Fibers having at least one near-infrared fluorescing compound associated therewith are prepared by contacting the fibers with the fluorescing compound(s) dissolved in an organic solvent. Suitable organic solvents include ketones and alcohols. The fibers may subsequently be air-dried to remove any remaining volatiles. Fibers coated with the marker solution desirably have less than 1 weight percent of the marker coated thereon.

12 Claims, No Drawings

U.S. PATENT DOCUMENTS

| | | | |
|---|---|---|---|
| 5,214,188 | 5/1993 | Tai et al. | 558/417 |
| 5,218,042 | 6/1993 | Kuo et al. | 524/601 |
| 5,292,855 | 3/1994 | Krutak et al. | 529/289 |
| 5,304,789 | 4/1994 | Lob et al. | 235/487 |
| 5,331,140 | 7/1994 | Stephany | 233/462 |
| 5,336,714 | 8/1994 | Krutak et al. | 524/608 |
| 5,380,842 | 1/1995 | Itoh et al. | 340/128 |
| 5,397,819 * | 3/1995 | Krutak et al. | 524/88 |
| 5,421,869 | 6/1995 | Gundjian et al. | 106/21 R |
| 5,423,432 | 6/1995 | Krutak et al. | 209/577 |
| 5,460,646 * | 10/1995 | Lazzouni et al. | 106/31.34 |
| 5,461,136 | 10/1995 | Krutak et al. | 528/289 |
| 5,486,274 | 1/1996 | Thetford et al. | 204/157.5 |
| 5,514,860 | 5/1996 | Berson | 235/468 |
| 5,525,516 | 6/1996 | Krutak et al. | 436/56 |
| 5,542,971 | 8/1996 | Auslander et al. | 106/21 A |
| 5,553,714 | 9/1996 | Cushman et al. | 209/577 |
| 5,608,053 | 3/1997 | Thetford et al. | 540/146 |
| 5,614,008 | 3/1997 | Escano et al. | 106/23 D |
| 5,665,151 | 9/1997 | Escano et al. | 106/31.15 |
| 5,703,229 | 12/1997 | Krutak et al. | 540/140 |
| 5,744,000 * | 4/1998 | Athey et al. | 162/140 |
| 5,932,139 * | 8/1999 | Oshima et al. | 252/301.16 |
| 6,036,885 * | 3/2000 | Krutak, Sr. et al. | 252/301.34 |

\* cited by examiner

FIBER COATING COMPOSITION HAVING AN INVISIBLE MARKER AND PROCESS FOR MAKING SAME

CROSS REFERENCE TO RELATED APPLICATIONS

Priority is claimed to the earlier filed patent application having U.S. Ser. No. 60/087429 filed Jun. 1, 1998, the disclosure of which is incorporated herein by reference.

FIELD OF THE INVENTION

The present invention relates to fibers having at least one invisible near-infrared fluorophore coated onto at least a portion of the fiber surface. Such marked fibers can be used in the production of woven and nonwoven textiles, cellulosic materials such as paper, paper board, pulp, fluff pulp, synthetic materials and other products.

BACKGROUND OF THE INVENTION

In the textile industry, various types of fibers and materials are used in the manufacture of threads, yarns, fabrics and finished materials. Three types of fabrics known to those skilled in the art include woven, nonwoven and knitted fabrics. Nonwoven materials are manufactured by means other than by weaving or knitting. Nonwoven materials are utilized in a broad and diverse range of products, such as, absorbent pads, wiping and cleaning sheets and fabrics, insulation, liners, wicks, relatively thick battings, compressed bonded battings and webs, bandages, incontinence structures, filters and the like. Woven and knitted materials typically use a thread or yarn material and are produced by using a weaving or knitting apparatus known to those skilled in these arts.

Synthetic materials and combinations of natural and synthetic materials are becoming increasingly plentiful and inexpensive. For example, fabrics coated at least on one side with film or foamed sheets made of various materials such as urethane, polyester, rubber, etc. are useful for producing light-weight, wind-resistant clothing; insulated materials; water-resistant products; etc. However, in certain characteristics, many of these materials do not compare well to natural fibers, such as, the ability to transport moisture satisfactorily, improved softness and wetting characteristics. All of these characteristics are important, and in the use of staple fibers, the fibers must perform satisfactorily in known operations such as blending, carding, roving, drawing, spinning, weaving, knitting, bonding, heating, compressing, hydro-entangling, needle-punching, and the like. Generally, to facilitate such operations the fibers are coated with certain processing lubricants, such as those based on potassium lauryl phosphate or mineral oil. U.S. Pat. Nos. 5,372,739 and 5,677,058 disclose altering certain surface characteristics of various fibers by applying a lubricant composition having a mixture of high and low molecular weight polyethylene glycol fatty acid esters and other hydrophilic compositions. Modifications of these compositions to include various additives are also described.

Additionally, for certain useful applications, such as wet wipes and absorbent structures, liquid-transport durability is a desirable characteristic but difficult to obtain in some man-made fibers. Certain man-made fibers, and particularly those with suitable non-round cross-sections, have some initial liquid-transport characteristics which diminish after wet usage, washing or scouring. The ability of these fibers to transport liquid can in some instances diminish significantly.

Moreover, the crimping of a staple fiber by various means has been found to be an essential element in producing a certain controlled amount of fiber cohesion or resistance to pulling apart in forming carded webs. These webs of separated fibers are formed in flat-top or roller-top carding machines or the like as part of nonwoven or textile processes.

Poor crimp formation, especially in fibers with non-round cross-sections, has been associated with low and variable cohesion, weak webs, web separation, and poor processability during carding and/or subsequent operations. Relatively high lubricant levels and particularly those above 0.2 weight percent of certain processing lubricants can cause unsatisfactory cohesion and processability in carding.

Use of fluorescent agents for the tracing and identification of articles such as monitoring the integrity of the yarn or fiber during slashing, warping or weaving is described in U.S. Pat. No. 4,992,204. The patent discloses tagging a material with a luminophore that is cross-linked with at least one poly(oxyalkylene). The tagging compound has an absorbance within the range of about 300 mn to 400 nm.

Heretofore, fluorescent materials have substantially been used for security measures. For example, U.S. Pat. No. 4,504,084 issued to Miehe et al. on Nov. 12, 1991 discloses a method for marking originals so that copies can be distinguished from the originals. The method includes using a printing ribbon having a substance in the form of a marking which, when used, produces an invisible distinguishable mark which is recognizable only by using a special scanner.

In the co-pending patent application Ser. No. 09/303,338 entitled "FIBERS CONTAINING MARKER COMPOSITIONS AND CROSS-LINKED POLYMERS" filed on even date herewith, the entire disclosures being incorporated herein by reference, it is disclosed that certain near-infrared compositions can be applied and associated with fibers and fibrous materials by using cross-linking agents.

In some applications, removal of water is necessary using means known in the art prior to use of the treated fibers. In some applications, fairly rapid drying or evaporation of the carrier fluid is desired, which could make a water-soluble or water-dispersed coating unsatisfactory. In yet certain other applications, near-infrared markers dissolved or dispersed in water do not penetrate hydrophobic materials well.

Accordingly, there is a need for a marking compound that is substantially invisible to the unaided human eye in the ultraviolet and normal light wavelengths and which may be dried at a faster rate, a lower temperature and/or has a better penetration relative to such aqueous-based coating compositions.

SUMMARY OF THE INVENTION

Broadly, the present invention relates to a material having a near-infrared fluorophore associated with the material. The marked materials of the invention can be used in the manufacture of a variety of articles, such as filters, absorbent pads, insulation, liners, non-bonded and bonded battings, paper and cellulose-containing products, incontinent structures, threads, filters, garments and reinforced polymers. The near-infrared fluorophore is dissolved in an organic solvent so that less than about 0.5 weight percent of the compound after evaporation of said solvent is associated with the fiber.

Another aspect of the invention is a method for tagging a fiber with a fluorescing compound comprising contacting the fiber with a solution having less than about 0.5 weight percent of the compound dissolved in an organic solvent.

It is an object of the invention to provide a fiber or other materials having a fluorescing compound associated therewith.

It is another object of the invention to provide a method for tagging a fiber or other material with a fluorescing compound.

Numerous other objects and advantages of the present invention will become readily apparent from the following detailed description of the preferred embodiments and the appended claims.

DETAILED DESCRIPTION OF THE PREFERRED EMBODIMENTS

Although the present invention is susceptible to different embodiments, it is to be understood that the present disclosure is to be considered as an exemplification of the principles of the invention and is not intended to limit the invention to the embodiments illustrated.

According to the present invention, a variety of fibers, natural and man-made, and further including various materials made therefrom, may be readily marked with a near-infrared compound by dissolving the compound into an organic solvent and applying the resultant solution to the fibers. Examples of suitable fibers include wool, cotton, flax, jute, cellulosic fibers, fur, polyesters including copolyesters, nylon, olefins, polyphenylene sulfide, modacrylic, rayon viscose and suitable mixtures or blends thereof. Preferred fibers include polyesters, nylon, wool, cotton, wood and blends or mixtures thereof.

The preferred polyesters including copolyesters are selected from relatively oriented polyesters, relatively non-oriented polyesters, polyesters modified for basic dyeability, and polyesters containing starch. Other polyesters containing cellulose propionate, polyesters containing cellulose butyrate, and polyesters containing modified starch, such as starch acetate may be used provided the fiber is insoluble or substantially insoluble in the solvent.

In accordance with the invention, man-made fibers may optionally contain other additives, such as, pigments, delusterants, (such as $TiO_2$), optical brighteners and combinations thereof. Such additives may also include at least one suitable rare earth compound. If desired, these optional materials can be added to the dissolved marker composition using known techniques, such as, blending, mixing, and the like.

The fibers of the present invention may have any shape (round or non-round cross-section configurations), such as those disclosed in U.S. Pat. Nos. 4,842,792 and 4,954,398, the entire disclosures of each being incorporated herein by reference. Blends of fibers having different cross-sections or shapes may be particularly useful as they provide greater sites for associating the composition with the fibers. Advantageously, the present invention makes it possible to mark a wide variety of articles, such as suits, dresses, sportswear, shirts, ties, and other garments; fabrics for medical uses; filtration materials; nonwovens; shoes; boots; sailcloth; paper products; packaging materials including cardboard; book covers; leather goods; adhesive tapes and the like.

The near-infrared fluorophore compound used in accordance with the invention should have excellent thermal stability and little light absorption in the visible region, i.e., they should impart little or no color to the treated materials. The most desired near-infrared fluorophores have a strong wavelength absorption of near-infrared light and have strong fluorescence in the near-infrared wavelengths of about 670–1100 nm. Suitable invisible marking compositions include near-infrared fluorophores such as those disclosed in U.S. Pat. Nos. 4,255,273; 5,292,855; 5,336,714; 5,397,819; 5,461,136; 5,525,516; 5,553,714 and 5,423,432, the entire disclosures of each being incorporated herein by reference.

The preferred near infrared fluorescent compound are selected from phthalocyanines, naphthalocyanines and squaraines corresponding to formulae I, II and III:

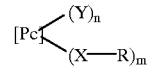
(I)

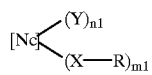
(II)

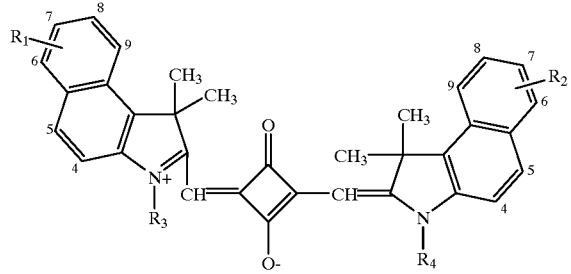
(III)

where Pc and Nc represent the phthalocyanine and naphthalocyanine moieties of Formulae Ia and IIa,

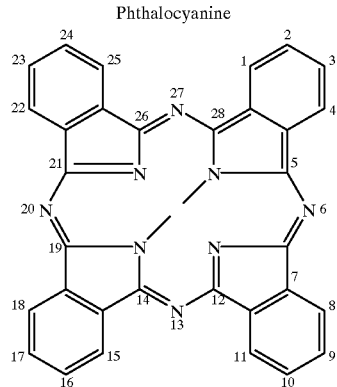
Ia
Phthalocyanine

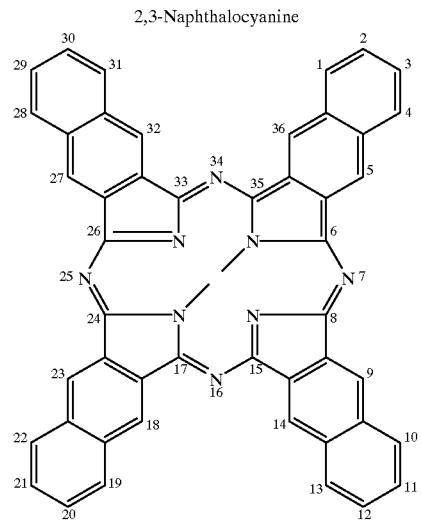
IIa
2,3-Naphthalocyanine respectively, covalently bonded to hydrogen or to various metals, halometals, organometallic groups, and oxymetals including AlCl, AlBr, AlOH, AlOR$_5$, AlSR$_5$, Ge, Ge(OR$_6$), Ga, InCl, Mg, SiCl$_2$, SiF$_2$, SnCl$_2$, Sn(OR$_6$)$_2$, Si(SR$_6$)$_2$, or Zn, wherein R$_5$ and R$_6$ are selected from hydrogen, alkyl, aryl, heteroaryl, lower alkanoyl, trifluoroacetyl, groups of the formulae:

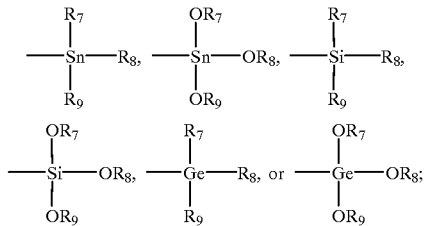

R$_7$, R$_8$, and R$_9$ are independently selected from alkyl, phenyl or phenyl substituted with lower alkyl, lower alkoxy or halogen.

X is selected from oxygen, sulfur, selenium, tellurium or a group of the formula N(R$_{10}$), wherein R$_{10}$ is hydrogen, cycloalkyl, alkyl, acyl, alkylsulfonyl, or aryl or R$_{10}$ and R taken together form an aliphatic or aromatic ring with the nitrogen atom to which they are attached.

Y is selected from alky, aryl, heteroaryl, halogen or hydrogen,

R is selected from unsubstituted or substituted alkyl, alkenyl, alkynyl, C$_3$–C$_8$ cycloalkyl, aryl, herteroaryl,

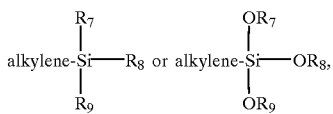

or (X—R) moiety is alkylsulfonylamino, arylsulfonylamino, or a group selected from the formulae— X(C$_2$H$_4$O)$_z$R$^1$,

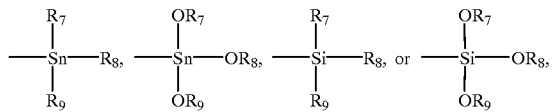

wherein R$^1$ is hydrogen or R is as defined above; z is an integer from 1 to 4.

Further, two (X—R) moieties can be taken together to form divalent substituents of the formula:

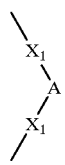

wherein each X$_1$ is independently selected from —O—, —S—, or —N(R$_{10}$)— and A is selected from ethylene; propylene; trimethylene; and such groups substituted with C$_1$–C$_4$ alkyl, C$_1$–C$_4$ alkoxy, aryl and cycloalkyl; 1,2-phenylene and 1,2-phenylene containing 1–3 substituents selected from C$_1$–C$_4$ alkyl, C$_1$–C$_4$ alkoxy or halogen.

The R$_1$ and R$_2$ moieties are independently selected from hydrogen, lower alkyl, lower alkoxy, halogen, aryloxy, lower alkyl-thio, arylthio, lower alkylsulfonyl; arylsulfonyl; lower alkyl-sulfonyl-amino, lower alkanoylamine, arylsulfonylamino, cycloalkyl-sulfonylamino, carboxy, unsubstituted and substituted carbamoyl and sulfamoyl, lower alkoxycarbonyl, hydroxy, lower alkanoyloxy,

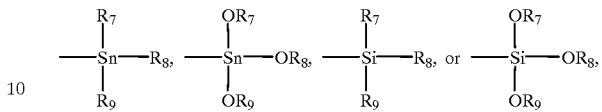

The R$_3$ and R$_4$ moieties are independently selected from hydrogen, lower alkyl, alkenyl or aryl; n is an integer from 0–16; n$_1$ is an integer from 0–24, provided the sums of n+m and n$_1$+m$_1$ are 16 and 24, respectively. It is to be understood that when n, m, n$_1$ or m$_1$ is 0, the respective moiety is absent.

In a preferred embodiment of this aspect of the present invention, m is from 4 to 12; m$_1$ is from 0–8; provided that in the definitions of the substituents (Y)n, (Y)n$_1$ and (X—R) m$_1$ that these substituents are not present when n, n$_1$, and m$_1$ are zero, respectively. Substituents (X—R) and (Y) are present in compounds Ia on there peripheral carbon atoms, i.e., in positions 1–4, 8–11, 15–18, 22–25 and substituents (X—R) and (Y) are present on the peripheral carbon atoms of IIa, i.e., in positions 1–5, 9–14, 18–23, 27–32 and 36.

Phthalocyanines and naphthalocyanines are preferred as the marking compound particularly where stability to UV radiation or sunlight is desirable.

In the above definitions, the term alkyl is used to designate a straight or branched chained hydrocarbon radical containing 1–12 carbons. In the terms lower alkyl, lower alkoxy, lower alkyl-thio, lower alkoxycarbonyl, lower alkylsufonyl, lower alkylsufonylamino, lower alkanoylamino, lower alkanoyl and lower alkanoyloxy the alkyl portion of the groups contains 1–6 carbons and may contain a straight or branched chain.

The term "cycloalkyl" is used to represent a cyclic aliphatic hydrocarbon radical containing 3–8 carbons, preferably 5–7 carbons.

The alkyl and lower alkyl portions of the previously defined groups may contain as further substituents one or more groups selected from hydroxy, halogen, carboxy, cyano, C$_1$–C$_4$-alkoxy, aryl, C$_1$–C$_4$-alkylthio, arylthio, aryloxy, C$_1$–C$_4$-alkoxycarbonyl or C$_1$–C$_4$-alkanoyloxy. The term "aryl" includes carbocyclic aromatic radicals containing 6–18 carbons, preferably phenyl and naphthyl, and such radicals substituted with one or more substituents selected from lower alkyl, lower alkoxy, halogen, lower alkylthio, N(lower alkyl)2,trifluro-methyl, carboxy, lower alkoxycarbonyl, hydroxy, lower alkanoyl-amino, lower alkylsulfonylamino, arylsulfonyl-amino, cycloalkylsulfonylamino, lower alkanoyloxy, cyano, phenyl, phenyl-thio and phenoxy.

The term "heteroaryl" is used to represent mono or bicyclic hetero aromatic radicals containing at least one "hetero" atom selected from oxygen, sulfur and nitrogen or a combination thereof. Examples of suitable hetero-aryl groups include: thiazolyl, benzo-thiazolyl, pyrazolyl, pyrrolyl, thienyl, furyl, thia-diazolyl, oxadiazolyl, benzoxazolyl, benzimidazolyl, pyridyl, pyrimidinyl and triazolyl. These heteroaryl radicals may contain the same substituents listed above as possible substituents for the aryl radicals. The term triazolyl also includes structure IV and mixed isomers thereof,

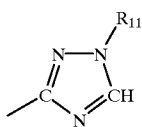

wherein $R_{11}$ is hydrogen or selected from lower alkyl and lower alkyl substituted with one or two groups selected from hydroxy, halogen, carboxy, lower alkoxy, aryl, cyano, cycloalkyl, lower alkanoyloxy or lower alkoxy-carbonyl.

The terms "alkenyl and alkynyl" are used to denote aliphatic hydrocarbon moiety having 3–8 carbons and containing at least one carbon-carbon double bond and one carbon-carbon triple bond, respectively.

The term halogen is used to include bromine, chlorine, fluorine and iodine.

The term "substituted carbamoyl" is used to denote a radical having the formula —$CONR_{12}R_{13}$, wherein $R_{12}$ and $R_{13}$ are selected from unsubstituted or substituted alkyl, alkenyl, alkynyl, cycloalkyl, aryl, or heteroaryl.

The term "substituted sulfamoyl" is used to denote a radical having the formula —$SO2NR_{12}R_{13}$, wherein $R_{12}$ and $R_{13}$ are as defined above.

The term "alkylene" refers to a divalent $C_1$–$C_{12}$ aliphatic hydrocarbon moiety, either straight or branched-chain, and either unsubstituted or substituted with one or more groups selected from lower alkoxy, halogen, aryl, or aryloxy.

The term "acyl" refers to a group of the formula R° C.(O)—O—, wherein R° is preferably a $C_1$–$C_{10}$ alkyl moiety. The term "alkyl sulfonyl" refers to a group of the formula R°SO2—, wherein R° is as defined for acyl.

The concentration of the near infrared fluorophore making compound can vary from about 10 ppm to about 30 weight %. The preferred level of the fluorophore is from about 0.1 weight % to about 10 weight %, and more preferably from about 0.1 to about 3 weight %. The concentration is selected to give an adequate fluorescence for the detection inspection or other specific purpose.

Organic solvents suitable for dissolving the near-infrared fluorophore compound include ketones and alcohols. Desirably, the solution contains less than about 3 weight percent of the near-infrared fluorophore dissolved therein. Preferably, the solution contains from about 0.1 ppm to about 0.1 weight percent, more preferably from about 0.1 ppm to about 100 ppm, yet more preferably from about 0.1 ppm to about 50 ppm and most preferably 10 ppm to about 25 ppm.

Based on the total weight of the fiber to be treated, the fibers are coated with at least about 0.1 weight percent of the solvent/marker composition of the invention. More preferably, the fibers are coated with at least about 0.3 weight percent with about 0.35 weight percent to about 3 weight percent of the solvent/marker composition being most preferred.

The solvent/marker composition may further include minor amounts of other additives, such as coloring agents, UV and visible fluorescent compounds, aroma-enhancing agents, scouring agents, UV blocking agents, anti-fungal or antibacterial agents, defoamers, hydrophilic components, super-absorbent powder or polymers, antiseptic additives, cross-linking agents, friction modifiers, antistats and mixtures thereof. Suitability of any of these additives must be determined on a case-by-case basis.

Cross-linking agents, such as modified polyester agents, acrylic cross-linking agents, modified acrylic copolymer emulsions, silicone-based cross-linking compositions, such as those available from Wacker Silicones, Inc., epoxy compositions, cross-linking polyurethane emulsions, and mixtures thereof. The cross-linking agents can be utilized either alone or in combination with suitable initiators and can be applied as post treatments, if desired. The concentration of the cross-linking agent used may vary from about 0.05 weight percent to about 20.0 weight percent, preferably from about 0.5 weight percent to about 15.0 weight percent, and more preferably from about 2 weight percent to about 14 weight percent wherein the weight percents are based on the dried weight of the treated fiber or treated material. Subsequent drying of these cross-linking agents can be accomplished in any manner which is suitable for removing water and/or heat setting to cause cross-linking to occur. For example, some agents can be satisfactorily cross-linked at room temperature while others require elevated temperatures.

The solvent/marker composition can be applied continuously or discontinuously to the various fibers, yarns, threads, or materials using techniques well known to those skilled in the respective processing art. For example, the solvent/marker composition can be sprayed or dropped onto the fiber, or the fiber may be immersed in a bath containing the solvent/marker composition, or the fibers can be contacted with a continuous flow of the solvent/marker composition, or the fiber may be contacted with the solvent/marker composition using a continuous film technique, or a semi-continuous pulsed flow methodology, or combinations of these techniques. For some applications it is desirable that the solvent/marker composition contact substantially all the fibers to provide uniform coverage of the resultant fibers while in other applications only a portion of the fibers need to be contacted. For all such applications, it is important to use processing conditions, including ventilation, which are appropriate for the solvent/marker composition being used.

Another aspect of the invention is a method for marking a fiber with near-infrared fluorescing compound. The method includes the steps of contacting the fiber or fibrous material with a fluorescing composition dispersed in a volatile solvent. The method can further include treating the fiber with a neutral or, preferably, a non-neutral preparation wash and, optionally, drying the treated fiber before contacting the fiber with the solvent/marker composition. However, such washing and drying treatments are usually not required.

The fibers containing the solvent/marker composition may be treated to an appropriate drying step such as heating in a tow dryer or on heated rolls, etc., which are equipped with suitable partial vacuum and/or ventilation means. Although not to be bound to any theory, it is believed that drying improves the attachment of the marker composition to the surface of the fibers. Advantageously, vacuum drying further removes any residual solvent volatiles from the solvent/marker composition. The overall heating or drying time of each type of fiber or application may be determined by those skilled in the art based on the solvent used and volumetric flow of air. However, drying time is preferably less than about 7 minutes and more preferably less than about 5 minutes. In some cases, satisfactory results can be obtained by heating and drying for about 15 to 30 seconds.

The following examples are intended to further illustrate the practice of the invention and are not intended to be a limitation thereon.

EXAMPLE 1

A polyester polymer with 2000 parts per million of 780 nm near-infrared fluorescent marker was prepared as follows:

About 103 grams of sebacic acid, 82 grams of diethylene glycol and 0.28 grams of a 780 nm marker were mixed together and, along with 75 ppm of titanium catalyst, were placed under heat, vacuum and stirring under the following conditions:

| Stage | Time (minutes) | Temp. (° C.) | Vacuum (torr) | Stir speed (rpm) |
|---|---|---|---|---|
| 1 | 1.0 | 200 | 760 | 25 |
| 2 | 5.0 | 200 | 760 | 300 |
| 3 | 60.0 | 200 | 760 | 300 |
| 4 | 5.0 | 220 | 760 | 300 |
| 5 | 120.0 | 220 | 760 | 300 |
| 6 | 10.0 | 250 | 760 | 300 |
| 7 | 5.0 | 250 | 760 | 300 |
| 8 | 7.0 | 250 | 400 | 200 |
| 9 | 0.1 | 250 | 400 | 200 |
| 10 | 7.0 | 250 | 100 | 200 |
| 11 | 7.0 | 250 | 10 | 200 |
| 12 | 10.0 | 250 | 0.1 | 200 |
| 13 | 22.0 | 250 | 0.6 | 200 |

When the cycle was completed, there was a yield of about 129 grams of a polyester polymer having 2000 ppm of 780 nm marker incorporated therein. Subsequently, 90 grams of this composition were mixed with 270 grams of spectro-grade acetone in a container, covered and heated to boiling while stirring until the polymer completely dissolved to form a first solution. The solution was cooled and placed in a tightly sealed container.

A second solution having about 25 ppm of the near-infrared fluorophore dissolved therein was prepared by adding 50 grams of the first solution to 950 grams of spectro-grade acetone to produce 1000 grams of the second solution.

Using a plastic dropper, individual drops of the second solution were released from a height of about 8 cm above a sheet of high-quality paper (21.6 cm×27.9 cm) in a laboratory hood with ventilation. The paper was made of 100 percent cotton, available from Crane & Co. (Dalton, Mass.). The average weight per sheet of paper was 8.1 grams. The average weight (n=10) of each drop of the marker solution was 0.0154 grams, as measured on a Mettler AE160 scale.

Each drop was plainly visible as it struck the paper, spreading to a diameter of about 3 to 3.5 cm. After about 45 to about 55 seconds at room temperature, the marked area was visually indistinguishable from the surrounding material. Subsequently, the marked area was readily detected in a semi-dark room with a □Wizard-V6" made by V.L. Engineering, Inc. of Cincinnati, Ohio.

EXAMPLE 2

The sleeve of a 60 percent cotton/40 percent polyester Oxford shirt was marked with three drops of the second solution. The drops were dispensed one above the other from a height of about 8 cm. Total amount of the marker solution added was about 0.046 grams. The drops spread out on the sleeve to an area of about 2 to 2.5 cm. After about 60 to 70 seconds the marked area was visually indistinguishable from the unmarked area of the shirt. However, the marked area was detectable by using the Wizard-V6 viewer described above. The marked area was also detectable using a laser-based "yes-no" detector of the proper excitation frequency.

The marked area on the shirt remained detectable after one washing and drying cycle in a home laundry under permanent-press conditions.

EXAMPLE 3

Another shirt of the cotton/polyester blend described in Example 2 was similarly marked, except the marker strength was diluted to a concentration of about 12 ppm using acetone. After marking the shirt, the acetone was allowed to evaporate for 5 minutes. Subsequently, the marks were detectable using the Wizard-V6 viewer and the laser-based "yes-no" detector described above.

EXAMPLE 4

A wool fabric with a light scrim backing attached suitable for winter coats was selected to be marked and evaluated using the marker (25 ppm) described in Example 1. The fabric was predominantly light-to-medium beige with flecks of gray, tan, brown and black and was woven in a herringbone weave. A sample of the wool fabric and attached scrim measuring 30×30 centimeters weighed 42.3 grams. Up to two drops of the marker were dropped from a plastic dropper (Samco Scientific, Inc. transfer pipettes, catalog No. 222) onto the wool fabric from a height of about 10 centimeters in six different spots. The average weight (n=10) of each drop before evaporation was about 0.0154 grams. The treated fabric remained in the ventilated hood for about 5 minutes to allow evaporation to take place. The six marked areas were easily detected by the "yes-no" laser-based detector. However; the marked areas were undetectable by the unaided human eye.

Although the present invention has been described in terms of the presently preferred embodiment, it is to be understood that such disclosure is not to be interpreted as limiting to the invention described herein. No doubt that after reading the disclosure, various alterations and modifications will become apparent to those skilled in the art to which the invention pertains. It is intended that the appended claims be interpreted as covering all such alterations and modifications as fall within the spirit and scope of the invention.

What is claimed is:

1. A composition comprising a fiber and a near-infrared fluorescing compound associated with said fiber, wherein said near-infrared fluorescing compound comprises a solution having about 0.5 weight percent of a near-infrared fluorophore dissolved in an organic solvent.

2. The composition of claim 1 wherein said fiber is selected from the group comprising polyester fibers, polyolefin fibers, polyphenylene sulfide fibers, modacrylic fibers, nylon fibers, viscose rayon fibers, cotton fibers, wool fibers, wood pulp and blends thereof.

3. The composition of claim 1 wherein said organic solvent is selected from the group consisting of ketones and alcohols.

4. The composition of claim 3 wherein said organic solvent is acetone.

5. The composition of claim 1 wherein said solution has from about 10 ppm to about 25 ppm of said near-infrared fluorophore in an organic solvent.

6. The composition of claim 1 wherein said near infrared fluorescent compound is selected from the group consisting of phthalocyanines, 2,3-naphthalocyanines and squaraines corresponding to Formulae I, II and III:

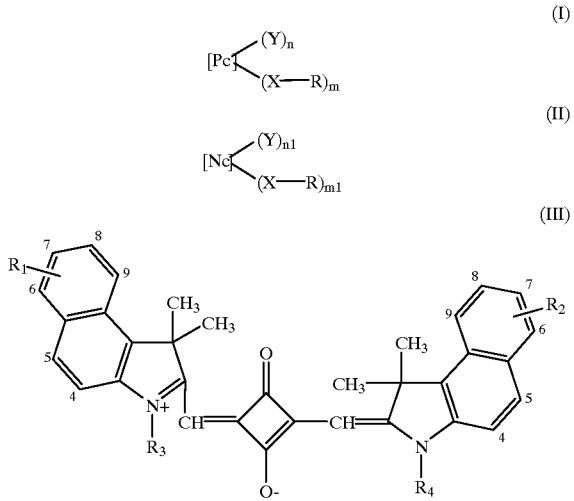

(I)

(II)

(III)

where Pc and Nc represent the phthalocyanine and naphthalocyanine moieties of Formulae Ia and IIa,

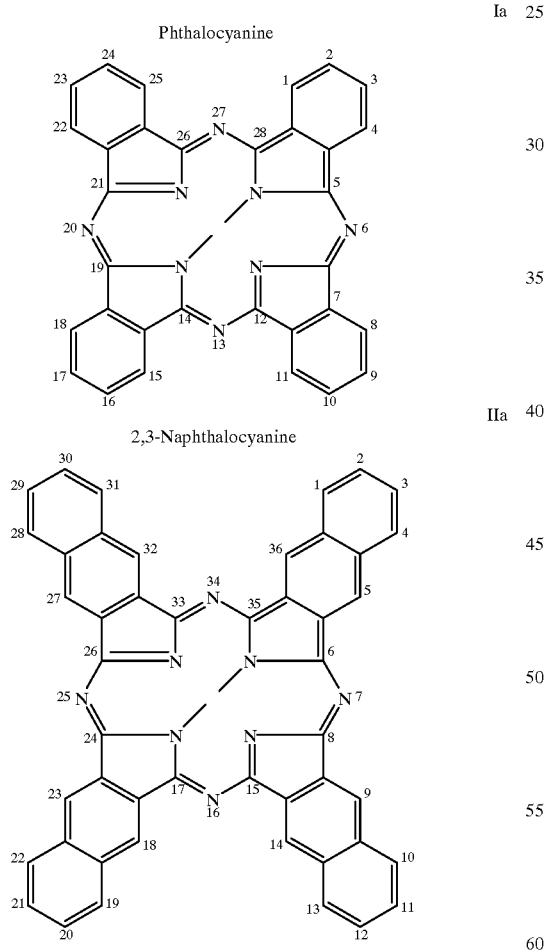

respectively, covalently bonded to a moiety selected from the group consisting of hydrogen and metals selected from the group consisting of AlCl, AlBr, AlOH, $AlOR_5$, $AlSR_5$, Ge, $Ge(OR_6)$, Ga, InCl, Mg, $SiCl_2$, $SiF_2$, $SnCl_2$, $Sn(OR_6)_2$, $Si(SR_6)_2$, or Zn, wherein $R_5$ and $R_6$ are selected from the group consisting of hydrogen, alkyl, aryl, heteroaryl, lower alkanoyl, trifluoroacetyl, groups of the formulae:

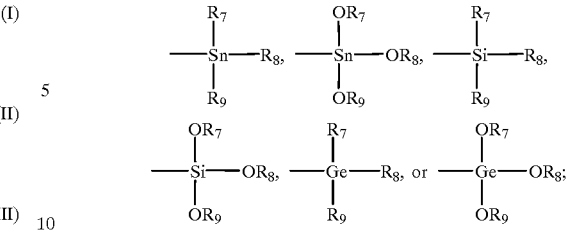

$R_7$, $R_8$, and $R_9$ are independently selected from the group consisting of alkyl, phenyl or phenyl substituted with lower alkyl, lower alkoxy and halogen;

X is selected from the group consisting of oxygen, sulfur, selenium, tellurium and a group of the formula $N(R_{10})$, wherein $R_{10}$ is selected from the group consisting of hydrogen, cycloalkyl, alkyl, acyl, alkylsufonyl, and aryl or $R_{10}$ and R taken together form an aliphatic or aromatic ring with the nitrogen atom to which they are attached;

Y is selected from alkyl, aryl, heteroayl, halogen or hydrogen;

R is selected from the group consisting of unsubstituted or substituted alkyl, alkenyl, alkynyl, $C_3$-$C_8$ cycloalkyl, aryl, heteroaryl, and groups of the formulae

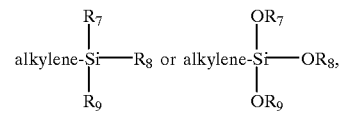

or (X—R) moiety is selected from the group consisting of alkylsulfonylamino,

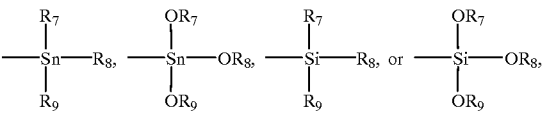

arylsulfonylamino, or a group selected from the formulae —$X(C_2H_4O)^zR^1$, wherein $R^1$ is hydrogen or R is as defined above; z is an integer from 1 to 4; or two (X—R) moieties can be taken together to form divalent substituents of the formula:

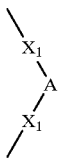

wherein each $X_1$ is independently selected from the group consisting of —O—, —S—, and —$N(R_{10})$— and A is selected from the group consisting of ethylene; propylene; trimethylene; and such groups substituted with $C_1$-$C_4$ alky, $C_1$-$C_4$ alkoxy, aryl and cycloalkyl; 1,2-phenylene and 1,2-phenylene containing 1–3 substituents selected from the group consisting of $C_1$-$C_4$ alkyl, $C_1$-$C_4$ alkoxy and halogen;

$R_1$ and $R_2$ are independently selected from the group consisting of hydrogen, lower alkyl, lower alkoxy, halogen, aryloxy, lower alkyl-thio, arylthio, lower alkylsulfonyl; arylsulfonyl; lower alkyl-sulfonylamino, lower alkanoylamine, arylsulfonylamino, cycloalkyl-sulfonylamino, carboxy, unsubstituted and substituted carbamoyl and sulfamoyl, lower alkoxycarbonyl, hydroxy, lower alkanoyloxy, and groups of the formulae:

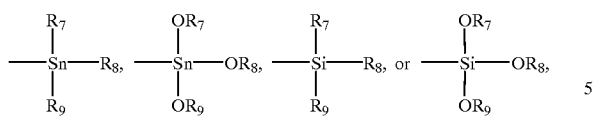

R$_3$ and R$_4$ moieties are independently selected from the group consisting of hydrogen, lower alkyl, alkenyl and aryl; n is an integer from 0–16; n$_1$ is an integer from 0–24, provided the sums of n+m and n$_1$+m$_1$ are 16 and 24, respectively.

7. A composition comprising a fiber selected from the group consisting of polyester fibers, polyolefin fibers, polyphenylene sulfide fibers, modacrylic fibers, nylon fibers, viscose rayon fibers, cotton fibers, wool fibers, wood pulp and blends thereof and a near-infrared fluorescing compound selected from the group consisting of phthalocyanines, 2,3-naphthalocyanines and squaraines corresponding to Formulae I, II and III:

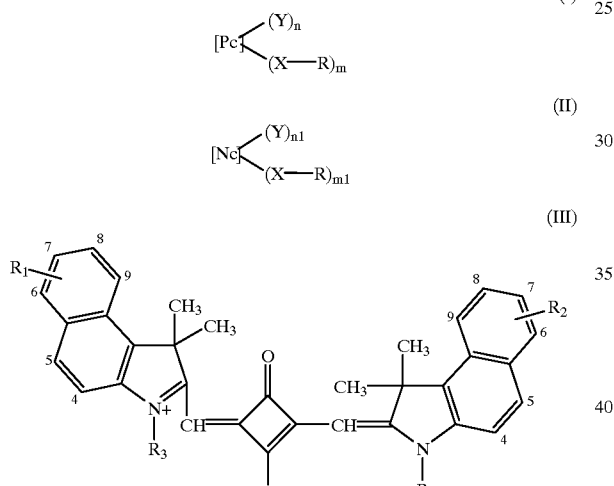

where Pc and Nc represent the phthalocyanine and naphthalocyanine moieties of Formulae Ia and IIa,

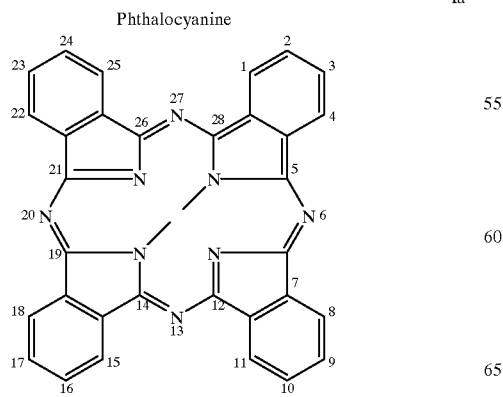

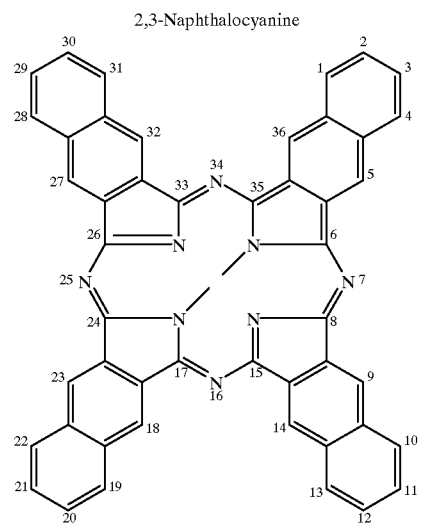

respectively, covalently bonded to a moiety selected from the group consisting of hydrogen and metals selected from the group consisting of AlCl, AlBr, AlOH, AlOR$_5$, AlSR$_5$, Ge, Ge(OR$_6$), Ga, InCl, Mg, SiCl$_2$, SiF$_2$, SnCl$_2$, Sn(OR$_6$)$_2$, Si(SR$_6$)$_2$, or Zn, wherein R$_5$ and R$_6$ are selected from the group consisting of hydrogen, alkyl, aryl, heteroaryl, lower alkanoyl, trifluoroacetyl, groups of the formulae:

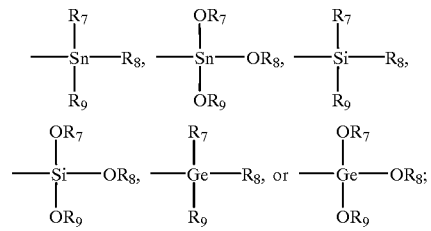

R$_7$, R$_8$, and R$_9$ are independently selected from the group consisting of alky, phenyl or phenyl substituted with lower alkyl, lower alkoxy and halogen;

X is selected from the group consisting of oxygen, sulfur, selenium, tellurium and a group of the formula N(R$_{10}$), wherein R$_{10}$ is selected from the group consisting of hydrogen, cycloalkyl, alkyl, acyl, alklsulfonyl, and aryl or R$_{10}$ and R taken together form an aliphatic or aromatic ring with the nitrogen atom to which they are attached;

Y is selected from alkyl, aryl, heteroaryl, halogen or hydrogen;

R is selected from the soup consisting of unsubstituted or substituted alkyl, alkenyl, alkynyl, C$_3$–C$_8$ cycloalkyl, aryl, heteroaryl, and groups of the formulae

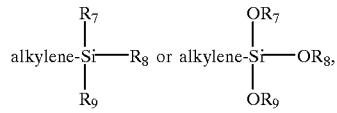

or (X—R) moiety is selected from the group consisting of alkylsulfonylamino,

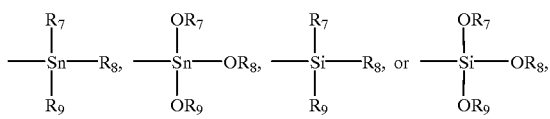

arylsulfonylamino, or a group selected from the formulae —X(C₂H₄O)ᵤR¹, wherein R¹ is hydrogen or R is as defined above; z is an integer from 1 to 4; or two (X—R) moieties can be taken together to form divalent substituents of the formula:

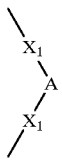

wherein each $X_1$ is independently selected from the group consisting of —O—,—S—, and —N($R_{10}$)— and A is selected from the group consisting of ethylene; propylene; trimethylene; and such groups substituted with $C_1$–$C_4$ alkyl, $C_{1-4}$ alkoxy, aryl and cycloalkyl; 1,2-phenylene and 1,2-phenylene containing 1–3 substituents selected from the group consisting of $C_1$–$C_4$ alkyl, $C_1$–$C_4$ alkoxy and halogen;

$R_1$ and $R_2$ are independently selected from the group consisting of hydrogen, lower alkyl, lower alkoxy, halogen, aryloxy, lower alkyl-thio, arylthio, lower alkylsulfonyl; arylsulfonyl; lower alkyl-sulfonylamino, lower alkanoylamine, arylsulfonylamino, cycloalkyl-sulfonylamino, carboxy, unsubstituted and substituted carbamoyl and sulfamoyl, lower alkoxycarbonyl, hydroxy, lower alkanoyloxy, and groups of the formulae

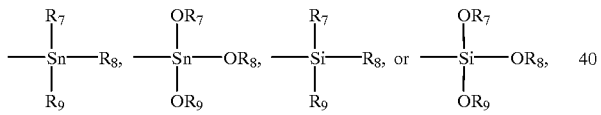

$R_3$ and $R_4$ moieties are independently selected from the group consisting of hydrogen, lower alkyl, alkenyl and aryl; n is an integer from 0–16; $n_1$ is an integer from 0–24, provided the sums of n+m and $n_1+m_1$ are 16 and 24, respectively associated with said fiber, wherein said near-infrared fluorescing compound comprises a solution having about 0.5 weight percent of a near-infrare fluorophore dissolved in an organic solvent selected from the group consisting of ketones and alcohols.

8. A method for tagging fibers with a near-infrared compound comprising the step of contacting said fibers with a solution having in the range of 10 ppm to 0.5 wt % of said near-infrared fluorescing compound dissolved in an organic solvent so as to coat the fibers with in the range of from about 0.1 to about 3 weight percent of said solution.

9. The method of claim 8 wherein said fibers are selected from the group consisting of natural fibers and synthetic fibers.

10. The method of claim 9 wherein said synthetic fibers are selected from the group consisting of polyester, polyolefin, polyhenylene sulfide, polyacrylic, nylon, viscose rayon and blends thereof.

11. The method of claim 8 wherein said near-infrared fluorescing compound selected from the group consisting of phthalocyanmes, 2,3-naphthalocyanines and squaraines corresponding to Formulae I, II and III:

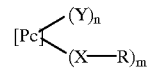

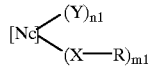

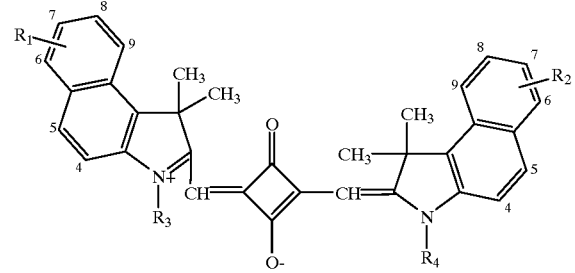

where Pc and Nc represent the phthalocyanine and naphthalocyanine moieties of Formulae Ia and IIa,

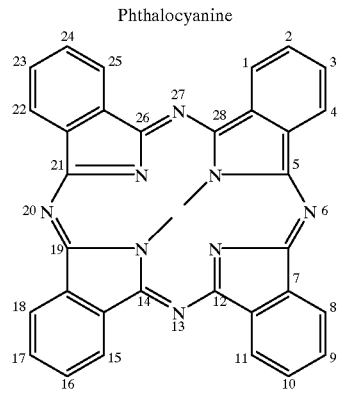

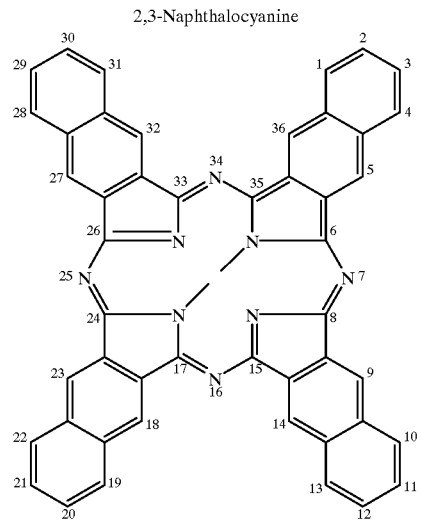

respectively, covalently bonded to a moiety selected from the group consisting of hydrogen and metals selected from the group consisting of AlCl, AlBr, AlOH, AlOR₅, AlSR₅, Ge, Ge(OR$_6$), Ga, InCl, Mg, SiCl$_2$, SiF$_2$, SnCl$_2$, Sn(OR$_6$)$_2$, Si(SR$_6$)$_2$, or Zn, wherein R$_5$ and R$_6$ are selected from the group consisting of hydrogen, alkyl, aryl, heteroaryl, lower alkanoyl, trifluoroacetyl, groups of the formulae:

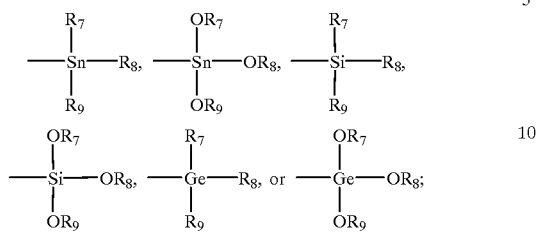

R$_7$, R$_8$, and R$_9$ are independently selected from the group consisting of alkyl, phenyl or phenyl substituted with lower alkyl, lower alkoxy and halogen;

X is selected from the group consisting of oxygen, sulfur, selenium, tellurium and a group of the formula N(R$_{10}$), wherein R$_{10}$ is selected from the group consisting of hydrogen, cycloalkyl, alkyl, acyl, alkylsulfonyl, and aryl or R$_{10}$ and R taken together form an aliphatic or aromatic ring with the nitrogen atom to which they are attached;

Y is selected from alkyl, aryl, heteroaryl, halogen or hydrogen;

R is selected from the group consisting of unsubstituted or substituted alkyl, alkenyl, alkynyl, C$_3$–C$_8$ cycloalkyl, aryl, heteroaryl, and groups of the formulae

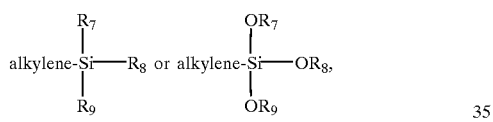

or (X—R) moiety is selected from the group consisting of alkylsulfonylamino,

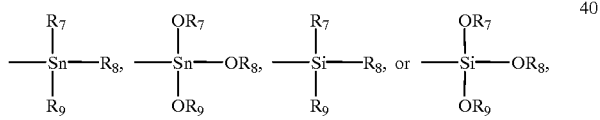

arylsulfonylamino, or a group selected from the formulae —X(C$_2$H$_4$O)$_z$R$^1$,
  wherein R$^1$ is hydrogen or R is as defined above; z is an integer from 1 to 4; or two (X—R) moieties can be taken together to form divalent substituents of the formula:

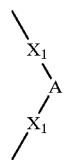

wherein each X$_1$ is independently selected from the group consisting of —O—, —S—, and —N(R$_{10}$)— and A is selected from the group consisting of ethylene; propylene; trimethylene; and such groups substituted with C$_1$–C$_4$ alkyl, C$_1$–C$_4$ alkoxy, aryl and cycloalkyl; 1,2-phenylene and 1,2-phenylene containing 1–3 substituents selected from the group consisting of C$_1$–C$_4$ alkyl, C$_1$–C$_4$ alkoxy and halogen;

R$_1$ and R$_2$ are independently selected from the group consisting of hydrogen, lower alkyl, lower alkoxy, halogen, aryloxy, lower alkyl-thio, arylthio, lower alkylsulfonyl; arylsulfonyl; lower alkyl-sulfonylamino, lower alkanoylamine, arylsulfonylamino, cycloalkyl-sulfonylamino, carboxy, unsubstituted and substituted carbamoyl and sulfamoyl, lower alkoxycarbonyl, hydroxy, lower alkanoyloxy, and groups of the formulae,

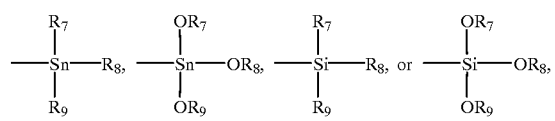

R$_3$ and R$_4$ moieties are independently selected from the group consisting of hydrogen, lower alkyl, alkenyl and aryl; n is an integer from 0–16; n$_1$ is an integer from 0–24, provided the sums of n+m and n$_1$+m$_1$ are 16 and 24, respectively.

12. A method for tagging fibers with a near-infrared compound comprising the step of contacting said fibers with a solution having in the range of 10 ppm to 0.5 wt % of said near-infrared fluorescing compound dissolved in an organic solvent, wherein said natural fibers are selected from the group consisting of wool, cotton, flax, jute, paper, fur, cardboard, wood pulp and mixtures thereof.

* * * * *